United States Patent
Snellman et al.

(10) Patent No.: US 9,600,544 B2
(45) Date of Patent: Mar. 21, 2017

(54) METHOD, APPARATUS AND COMPUTER PROGRAM PRODUCT FOR DISPLAYING ITEMS ON MULTIPLE FLOORS IN MULTI-LEVEL MAPS

(71) Applicant: Nokia Technologies Oy, Espoo (FI)

(72) Inventors: Carl Snellman, Belmont, MA (US); Peter L. Mikelsons, San Francisco, CA (US); Ville Karaila, San Jose, CA (US); Amol Khadilkar, Union City, CA (US); Cynthia Y. Kuo, Mountain View, CA (US); Kenneth Tracton, Palo Alto, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/139,189

(22) Filed: Dec. 23, 2013

(65) Prior Publication Data
US 2014/0122462 A1    May 1, 2014

Related U.S. Application Data

(63) Continuation of application No. 13/218,704, filed on Aug. 26, 2011, now Pat. No. 8,621,394.

(51) Int. Cl.
*G06F 17/30* (2006.01)
*G06Q 90/00* (2006.01)

(52) U.S. Cl.
CPC .. *G06F 17/30554* (2013.01); *G06F 17/30241* (2013.01); *G06Q 90/20* (2013.01)

(58) Field of Classification Search
CPC .................................... G06Q 90/20
See application file for complete search history.

(56) References Cited

U.S. PATENT DOCUMENTS 5,448,696 A    9/1995   Shimada et al.
5,689,669 A *  11/1997  Lynch et al. ............... 715/848
(Continued)

FOREIGN PATENT DOCUMENTS

| CN | 1410878 A | 4/2003 |
|---|---|---|
| CN | 101846736 A | 9/2010 |
| EP | 0 897 170 A2 | 2/1999 |
| JP | 09-330329 A | 12/1997 |
| JP | 3547947 B2 | 7/2004 |
| JP | 2010-266256 A | 11/2010 |
| JP | 2011-232505 A | 11/2011 |
| WO | WO 2010/035274 A2 | 4/2010 |

OTHER PUBLICATIONS

Assassin's Creed™ II by Ubisoft™, image taken from youtube video "Assassin's Creed 2 Gamplay", min. 2:46, Release Date Nov. 17, 2009, 1 page.

(Continued)

*Primary Examiner* — Robert Beausoliel, Jr.
*Assistant Examiner* — Nirav K Khakhar
(74) *Attorney, Agent, or Firm* — Alston & Bird LLP

(57) ABSTRACT

Methods, apparatuses and computer program products are provided for displaying search results and other points of interest located on multiple floors or levels in a multi-level map. A method may include receiving an input indicating a search criteria. Further, the method may include determining at least one search result position related to the search criteria, and determining a relationship between the at least one search result position and a multi-level map. In addition, the method may further comprise causing, based at least in part on the relationship, a level of the map and the at least one search result position to be displayed as a search result position indicator, wherein the displayed search result position indicator may be presented in a different manners based at least in part on what level the search result position is located. Corresponding apparatuses and computer program products are also provided.

21 Claims, 6 Drawing Sheets

(56) References Cited

U.S. PATENT DOCUMENTS

| | | | |
|---|---|---|---|
| 5,842,145 | A | 11/1998 | Zimmer |
| 5,945,976 | A | 8/1999 | Iwamura et al. |
| 6,201,544 | B1 | 3/2001 | Ezaki |
| 6,259,990 | B1 | 7/2001 | Shojima et al. |
| 6,397,143 | B1 | 5/2002 | Peschke |
| 6,405,129 | B1 | 6/2002 | Yokota |
| 6,671,619 | B2 | 12/2003 | Kusano et al. |
| 6,675,091 | B2 | 1/2004 | Navab |
| 6,728,636 | B2 | 4/2004 | Kokojima et al. |
| 7,044,372 | B2 | 5/2006 | Okuda et al. |
| 7,134,088 | B2 | 11/2006 | Larsen |
| 7,143,050 | B2 | 11/2006 | Crane |
| 7,263,375 | B2 | 8/2007 | Zavada et al. |
| 7,366,674 | B2 | 4/2008 | Dione |
| 7,496,445 | B2 | 2/2009 | Mohsini et al. |
| 7,627,421 | B2 | 12/2009 | Okamoto |
| 7,768,395 | B2 | 8/2010 | Gold |
| 7,954,070 | B2 | 5/2011 | Plocher et al. |
| 8,046,163 | B2 | 10/2011 | Rashid |
| 8,099,233 | B2 | 1/2012 | Matsuno et al. |
| 8,175,793 | B2 | 5/2012 | Stanton |
| 8,233,008 | B2 * | 7/2012 | Jin ........................... G06T 19/20 345/619 |
| 8,340,903 | B2 | 12/2012 | Dorfman |
| 8,352,176 | B2 | 1/2013 | Kaldewey et al. |
| 8,392,113 | B2 | 3/2013 | Gupta et al. |
| 8,434,029 | B2 | 4/2013 | Albright |
| 8,510,045 | B2 | 8/2013 | Rueben et al. |
| 8,538,687 | B2 | 9/2013 | Plocher et al. |
| 8,731,817 | B2 | 5/2014 | Ballew et al. |
| 2005/0051623 | A1 | 3/2005 | Okuda et al. |
| 2005/0083325 | A1 | 4/2005 | Cho |
| 2005/0086612 | A1* | 4/2005 | Gettman et al. ............. 715/848 |
| 2008/0034328 | A1* | 2/2008 | Cahill et al. ................. 715/855 |
| 2008/0062167 | A1 | 3/2008 | Boggs et al. |
| 2008/0183378 | A1 | 7/2008 | Weidner |
| 2009/0043504 | A1 | 2/2009 | Bandyopadhyay et al. |
| 2009/0055774 | A1 | 2/2009 | Joachim |
| 2009/0088964 | A1 | 4/2009 | Schaaf et al. |
| 2009/0112473 | A1 | 4/2009 | Lu et al. |
| 2009/0216438 | A1 | 8/2009 | Shafer |
| 2009/0237396 | A1 | 9/2009 | Venezia et al. |
| 2009/0319348 | A1 | 12/2009 | Khosravy et al. |
| 2010/0004852 | A1 | 1/2010 | Kawamura |
| 2010/0008337 | A1 | 1/2010 | Bajko |
| 2010/0121567 | A1 | 5/2010 | Mendelson |
| 2010/0146436 | A1 | 6/2010 | Jakobson et al. |
| 2010/0188088 | A1 | 7/2010 | Nielsen et al. |
| 2010/0217657 | A1* | 8/2010 | Gazdzinski ................. 705/14.5 |
| 2010/0280747 | A1 | 11/2010 | Achthoven |
| 2011/0130949 | A1 | 6/2011 | Arrasvuori |
| 2011/0137561 | A1 | 6/2011 | Kankainen |
| 2011/0153279 | A1 | 6/2011 | Zhang et al. |
| 2011/0161855 | A1 | 6/2011 | Prehofer |
| 2011/0161875 | A1 | 6/2011 | Kankainen |
| 2011/0172906 | A1 | 7/2011 | Das et al. |
| 2011/0246062 | A1 | 10/2011 | Whitmyer, Jr. |
| 2011/0270584 | A1 | 11/2011 | Plocher et al. |
| 2012/0166077 | A1 | 6/2012 | Herzog et al. |
| 2012/0173204 | A1 | 7/2012 | Padmanabhan et al. |
| 2012/0192067 | A1 | 7/2012 | DeLuca et al. |
| 2012/0316782 | A1 | 12/2012 | Sartipi et al. |
| 2013/0006525 | A1 | 1/2013 | Stroila |

OTHER PUBLICATIONS inFamous™ by Sony, images taken from youtube video "InFamous—Part 2", mins. 4:30-5:30, Release date May 26, 2009, 1 page.
Chittaro, L. et al., *Navigation Aids for Multi-Floor Virtual Buildings: A Comparative Evaluation of Two Approaches*, Proceeding VRST '06 Proceedings of the ACM Symposium on Virtual Reality Software and Technology (2006) pp. 227-235.
Ciavarella, C. et al., *The Design of a Handheld, Location-Aware Guide for Indoor Environments*, Personal and Ubiquitous Computing 8 (2004) 82-91.
Davidson, P. et al., *Application of Particle Filters for Indoor Positioning Using Floor Plains*, Ubiquitous Positioning Indoor Navigation and Location Based service (UPINLBS) (2010), 4 pages.
Holscher, C. et al., *Up the Down Staircase: Wayfinding Strategies in Multi-Level Buildings*, Journal of Environmental Psychology 26 (2006) 284-299.
Peterson, M. P., *Pervasive public map displays*, Chapter 15, Modern Cartography Series, Cybercartography—Theory and Practice, vol. 4 (2005), pp. 349-371.
Rehrl, K. et al., *Combined Indoor/Outdoor Smartphone Navigation for Public Transport Travelers*, na, 2005.
Retscher, G. et al., *Ubiquitous Positioning Technologies for Modern Intelligent Navigation Systems*, Journal of Navigation 59 (2006) 91-103.
"Micello Launches First Ever Set of Indoor Map APIs," [online] [retrieved Mar. 14, 2004]. Retrieved from the Internet: <http://www.micello.com/pressrelease/micello-launches-first-ever-set-indoor-map-apis>, Mar. 31, 2011, 1 page.
"Micello: Maps & Data Package," [online] [retrieved Mar. 14, 2004]. Retrieved from the Internet: <http://www.micello.com/products/maps>, 2 pages.
Singh, Raj, "In-Door Mapping—Raj Singh's Mobile Life," [online] [retrieved Mar. 14, 2014]. Retrieved from the Internet: <http://www.rajansingh.com/blog/2011/01/in-door-mapping/>, Jan. 23, 2011, 5 pages.
Chittaro, L. et al., *The Interactive 3D BreakAway Map: A Navigation and Examination Aid for Multi-floor 3D Worlds*, [online] [retrieved Aug. 27, 2014]. Retrieved from the Internet: <URL:http://hcilab.uniud.it/publications/2005-09/InteractiveBreakawayMap_CW2005.pdf?origin=publication_detail>. (dated 2005) 8 pages.
International Search Report and Written Opinion for Application No. PCT/FI2012/050794 dated Dec. 3, 2012.
Office Action for Mexican Application No. MX/a/2014/001816 dated Nov. 7, 2014.
Patent Examination Report No. 1 for Australian Patent Application No. 2012300749 dated Apr. 28, 2015.
Office Action for Canadian Application No. 2,845,922 dated Sep. 28, 2015.
Office Action for corresponding Chinese Application No. 201280041568.7 dated Aug. 11, 2015.
Office Action for corresponding Korean Application No. 10-2014-7007787 dated Jun. 3, 2015.
Office Action for corresponding Mexican Application No. MX/a/2014/001816 dated Jun. 1, 2015.
Office Action for corresponding Russian Application No. 2014107768 dated Jun. 11, 2015.
Patent Examination Report No. 2 from corresponding Australian Patent Application No. 2012300749, dated Sep. 15, 2015.
Office Action for Mexican Application No. MX/a/2014/001816 dated Sep. 14, 2016.
Office Action for Chinese Patent Application No. 201280041568.7 dated Aug. 23, 2016.
Supplementary European Search Report for Application No. EP 12 82 7838 dated Dec. 3, 2015.
Oliveira, A. et al., *Improving the Quality of Web-GIS Modularity With Aspects*, 2010 Seventh Internaitonal Conference on the Quality of Information and Communication Technology, IEEE Computer Society (2010) 132-141.
Truong, T., *iPhone App of the Week; FastMall 3.0*, The Epoch Times, Technology (Sep. 2-8, 2010) B7.
Office Action for Chinese Application No. 201280041568.7 dated Mar. 30, 2016.
Office Action for Canadian Application No. 2,845,922 dated Sep. 13, 2016.
Office Action for Vietnamese Patent Application No. 31658/SHTT-SC1 dated Sep. 28, 2016.
Office Action from U.S. Appl. No. 13/218,704 dated Dec. 20, 2012.
Notice of Allowance for U.S. Appl. No. 13/218,704 datd Aug. 20, 2013.

(56) References Cited

OTHER PUBLICATIONS

Office Action for Korean Application No. 10-2016-7005751 dated Jun. 1, 2016, 5 pages.
Office Action for corresponding Mexican Application No. MX/a/2014/001816 dated Jan. 18, 2016.
Office Action for Korean Application No. 10-2016-7005751 dated Dec. 7, 2016.

\* cited by examiner

METHOD, APPARATUS AND COMPUTER PROGRAM PRODUCT FOR DISPLAYING ITEMS ON MULTIPLE FLOORS IN MULTI-LEVEL MAPS

CROSS REFERENCE TO RELATED APPLICATION

This application is a continuation of and claims priority to U.S. application Ser. No. 13/218,704, filed on Aug. 26, 2011, which will issue on Dec. 31, 2013 as U.S. Pat. No. 8,621,394, the entire contents of which are hereby incorporated by reference.

TECHNOLOGICAL FIELD

Some example embodiments of the present invention relate generally to user interface technology and, more particularly, relate to a method and apparatus for displaying search results and other points of interest located on multiple floors or levels in a multi-level map.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by a number of consumers.

As the evolution of power and affordability of modern computing devices has included the release of computing devices capable of providing digital maps of geographical areas, locations, points of interests, and/or the like, users have increasingly desired that these geographical areas, locations, points of interest, and/or the like be accurately displayed. Indeed, some computing devices may be capable of displaying points of interest, addresses, or other locales, but in a somewhat imprecise manner by providing only an approximate position of the desired point of interest. For example, a point of interest located within a multi-level indoor building may be displayed as being located relative to a nearby road rather than at the specific location within the building. Further, when a user searches for a store within a shopping mall, the result that may be displayed is not the actual store, but the location of an entrance to the mall. In addition, even though shopping malls may include multiple entrances, the search result may identify only a single entrance to the mall, such as the main entrance, when a user searches for a store within the mall without consideration of the closest entrance to the store that is the subject of the search. Moreover, a shopping mall may have multiple levels, but the search result may not include information regarding which level the store is located, thereby still requiring the shopper to search for the store upon arriving at the mall.

Other detailed indoor maps that may be similarly limited in terms of their search functionality may include floor plans and other detailed information of buildings like shopping malls, airports, hospitals, universities, office buildings, and/or the like.

BRIEF SUMMARY

Methods, apparatuses, and computer program products are herein provided for displaying search results and other points of interest located on multiple floors or levels in a multi-level map. The methods, apparatuses, and computer program products of one example embodiment may provide a user with a visual representation of search result positions that indicate whether the search result position is located on the currently displayed level or a different level of the building displayed by the multi-level map. As such, a user may be able to more readily locate points of interest within a multi-level structure.

In a first example embodiment, a method may include receiving an input indicating a search criteria. Further, the method may include determining, by a processor, at least one search result position related to the search criteria, and determining a relationship between the at least one search result position and a multi-level map. In addition, the method may further comprise causing, based at least in part on the relationship, a level of the map and the at least one search result position to be displayed as a search result position indicator, wherein the displayed search result position indicator is presented in a different manner based at least in part on whether the search result position is on the level of the map that is displayed or is on another level of the map.

According to one example embodiment, the method may further include causing a two-dimensional map of a portion of a building to be displayed. In another embodiment, the method may include receiving an input indicating a selection of a desired level. Further, another example embodiment may include a method comprising causing the at least one search result position indicator to be displayed in an instance in which the at least one search result position is located within a portion of the map that is displayed. According to another embodiment, the method may include causing the at least one search result position to be displayed as an opaque search result position indicator in an instance in which the search result position is on the level of the map that is displayed. In addition, the method may include causing the at least one search result position to be displayed as a translucent search result position indicator in an instance in which the search result position is not on the level of the map that is displayed. In another embodiment, the method may include enabling interaction with the at least one search result position indicator in an instance in which the search result position is on the level of the map that is displayed and disabling interaction with the at least one search result position indicator in an instance in which the search result position is not on the level of the map that is displayed.

In another example embodiment, an apparatus may comprise at least one processor and at least one memory storing computer program code, wherein the at least one memory and stored computer program code are configured, with the at least one processor, to cause the apparatus to at least receive an input indicating a search criteria. In addition, the apparatus may comprise at least one processor and at least one memory storing computer program code, wherein the at least one memory and stored computer program code are configured, with the at least one processor, to cause the apparatus to determine at least one search result position related to the search criteria. According to one embodiment, the apparatus may comprise at least one processor and at least one memory storing computer program code, wherein the at least one memory and stored computer program code are configured, with the at least one processor, to cause the apparatus to determine a relationship between the at least one search result position and a multi-level map. In another embodiment, the apparatus may comprise at least one processor and at least one memory storing computer program code, wherein the at least one memory and stored computer program code are configured, with the at least one processor, to cause the apparatus to cause a level of the map and at least one search result position to be displayed as a search result position indicator, wherein the displayed search result position indicator is presented in a different manner based at least in part on whether the search result position is on the level of the map that is displayed or is on another level of the map.

In another example embodiment, a computer program product is provided. The computer program product of the example embodiment may include at least one non-transitory computer-readable storage medium having computer-readable program instructions stored therein. The computer-readable program instructions may comprise program instructions configured to cause an apparatus to perform a method comprising receiving an input indicating a search criteria. Further, the method may include determining, by a processor, at least one search result position related to the search criteria. In one embodiment, the method may include determining a relationship between the at least one search result position and a multi-level map. In addition the method may include causing, based at least in part on the relationship, a level of the map and the at least one search result position to be displayed as a search result position indicator, wherein the displayed search result position indicator is presented in a different manner based at least in part on whether the search result position is on the level of the map that is displayed or is on another level of the map.

In another example embodiment, an apparatus may include means for receiving an input indicating a search criteria. Further, the apparatus may include means for determining, by a processor, at least one search result position related to the search criteria, and determining a relationship between the at least one search result position and a multi-level map. In addition, the apparatus may further comprise means for causing, based at least in part on the relationship, a level of the map and the at least one search result position to be displayed as a search result position indicator, wherein the displayed search result position indicator is presented in a different manner based at least in part on whether the search result position is on the level of the map that is displayed or is on another level of the map.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE SEVERAL VIEWS OF THE DRAWINGS

Figure 1:
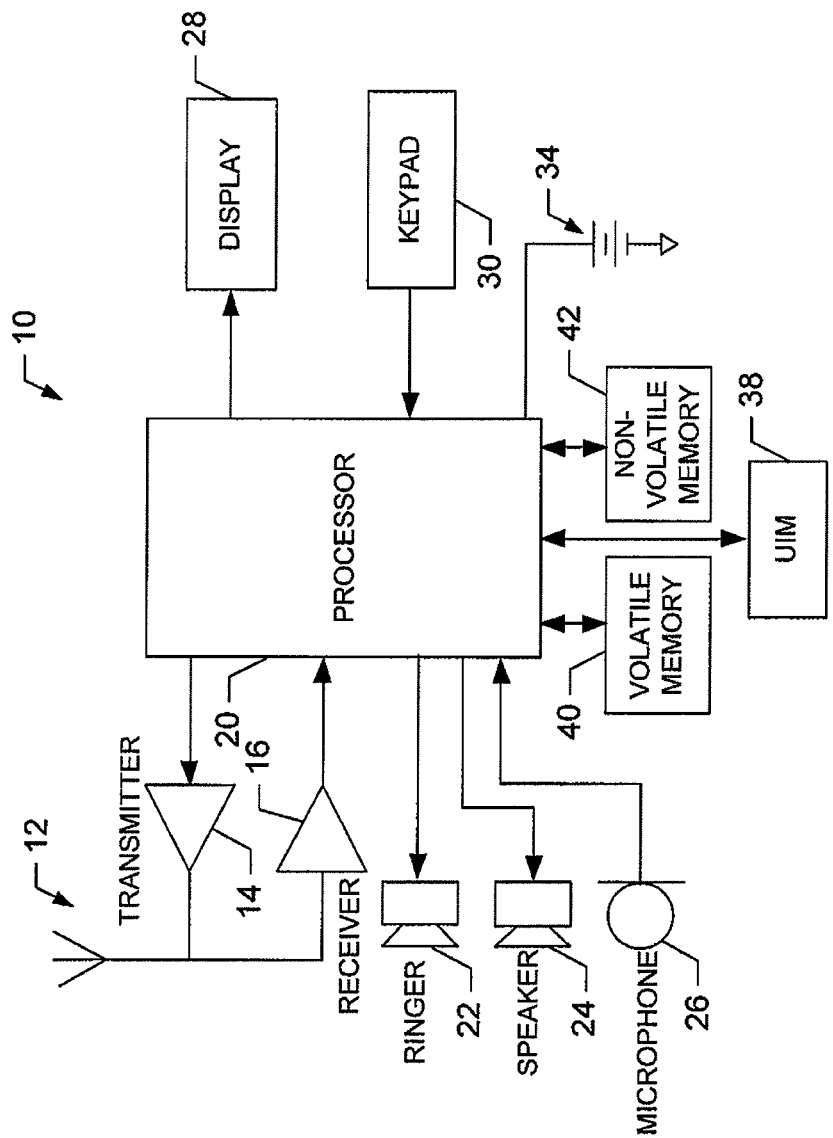
Figure 2:
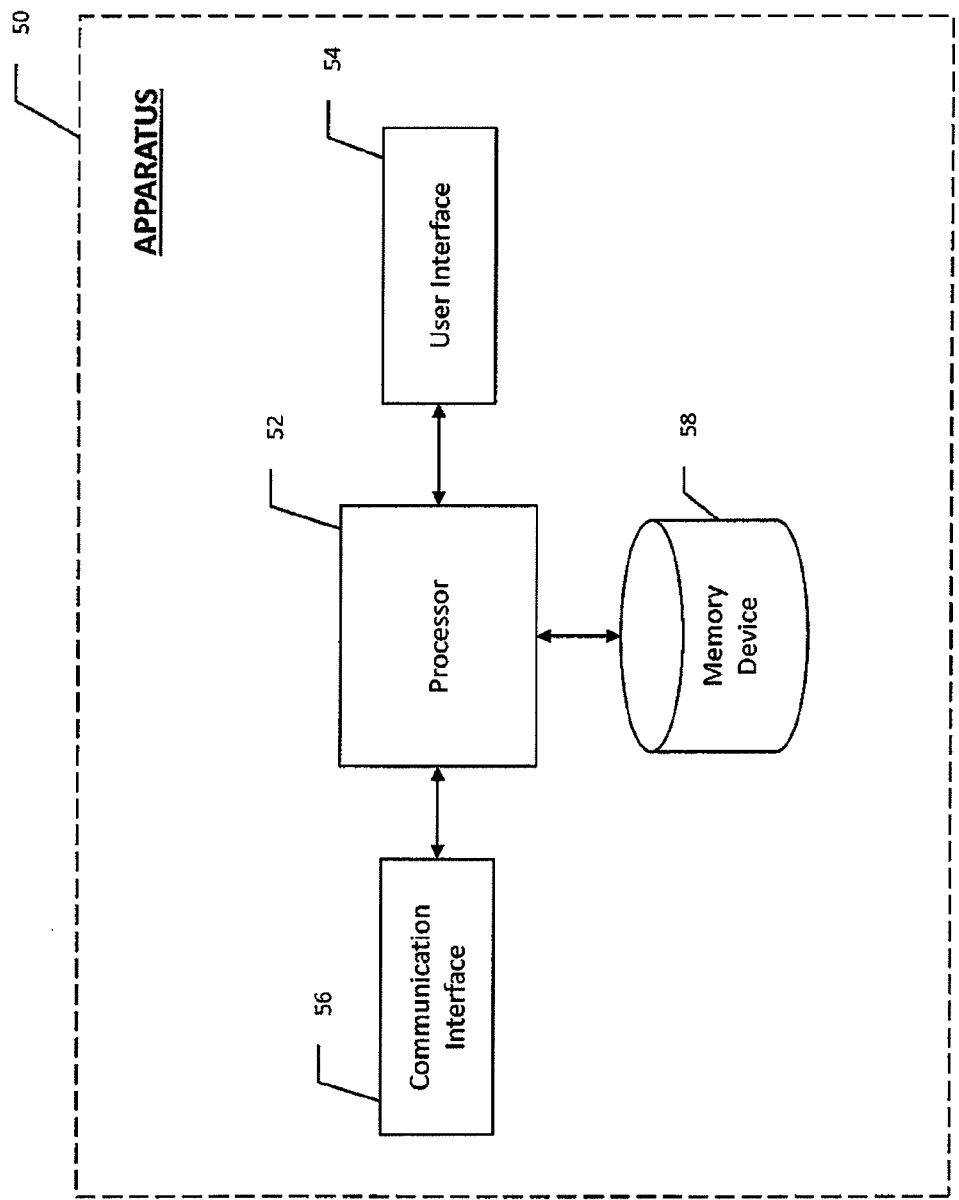
Figure 3:
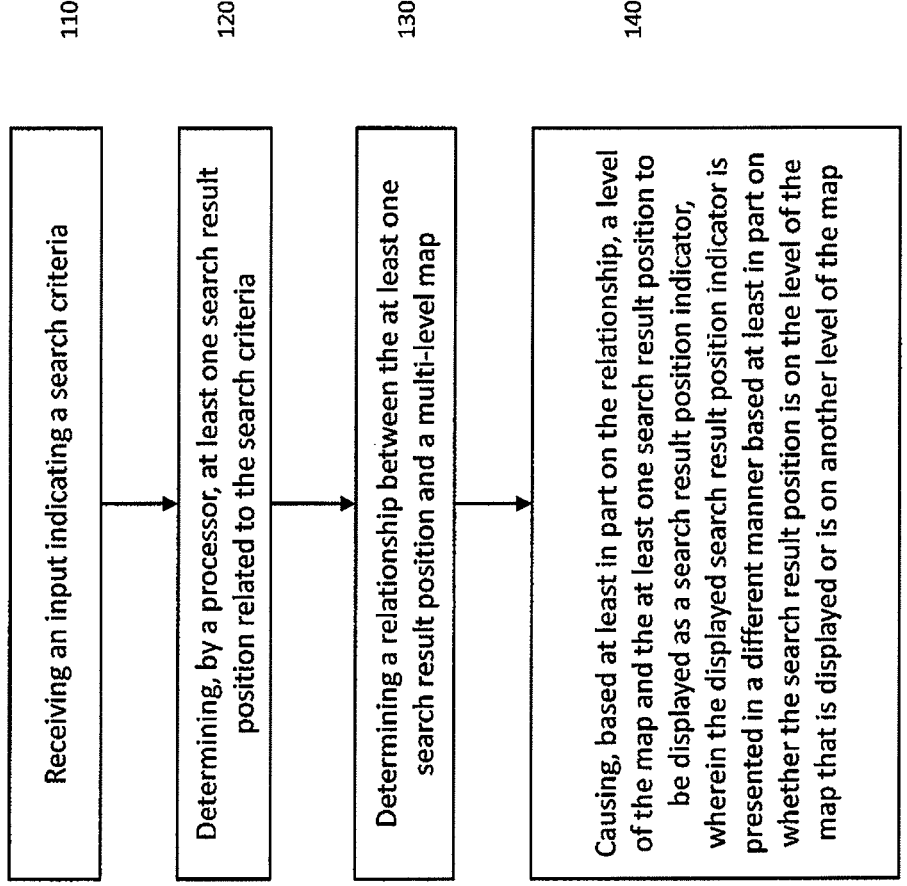
Figure 4:
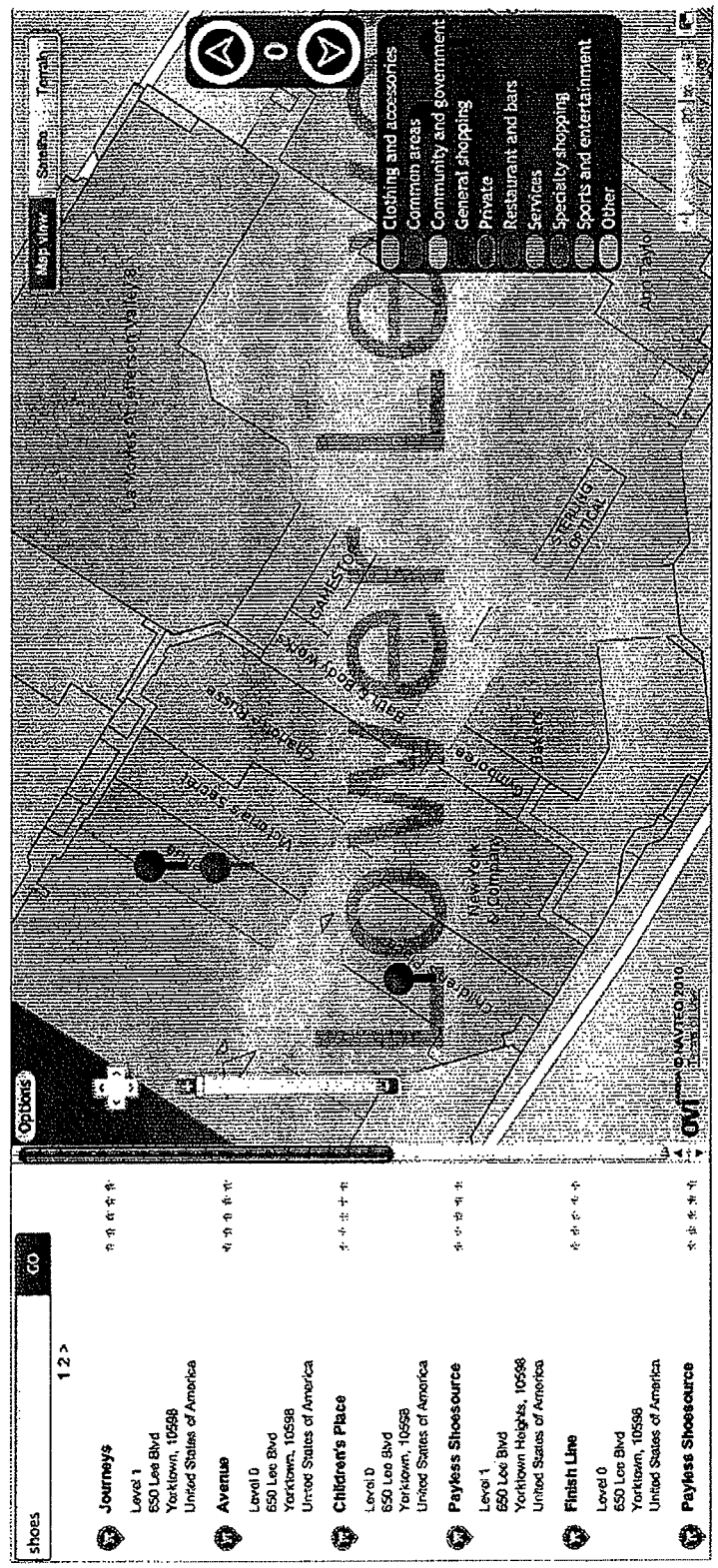
Figure 5:
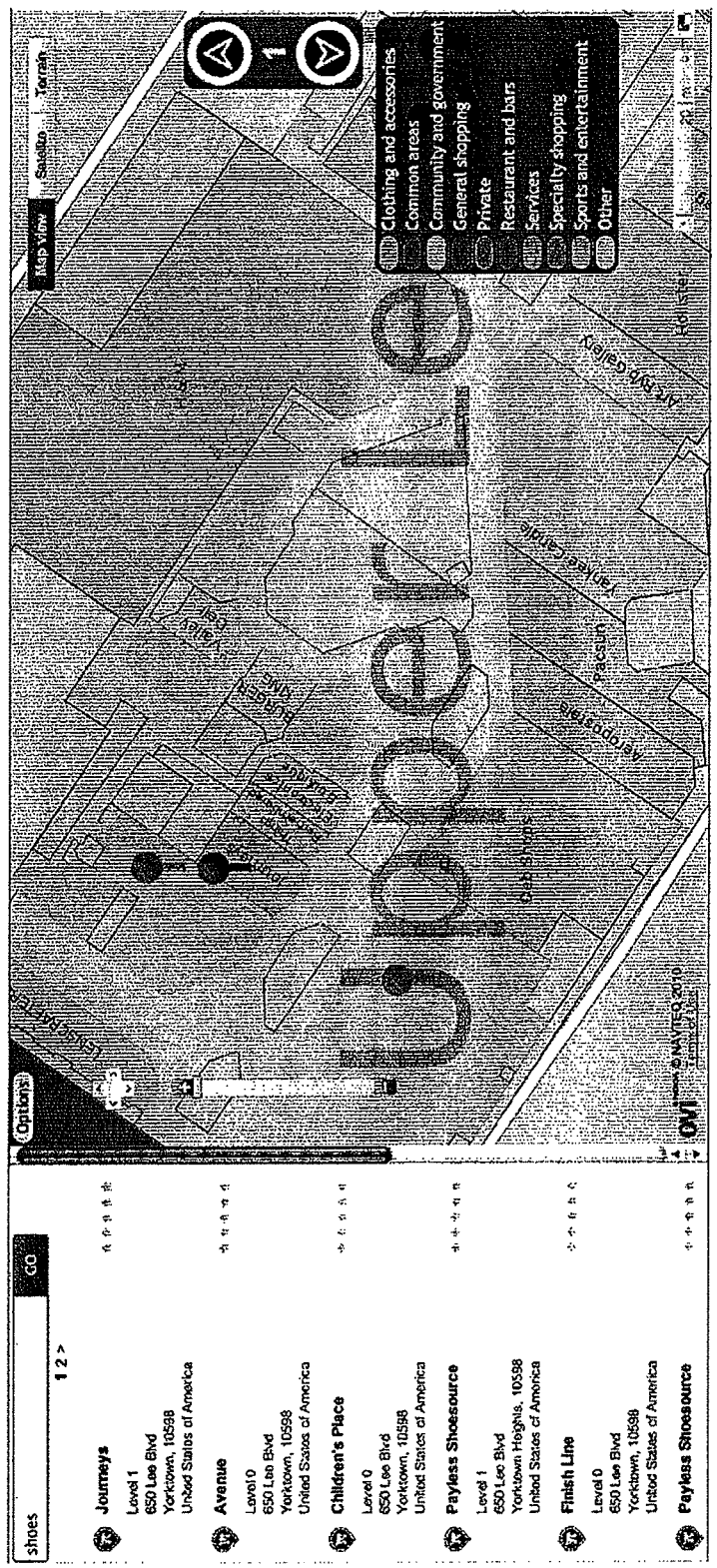
Figure 6:
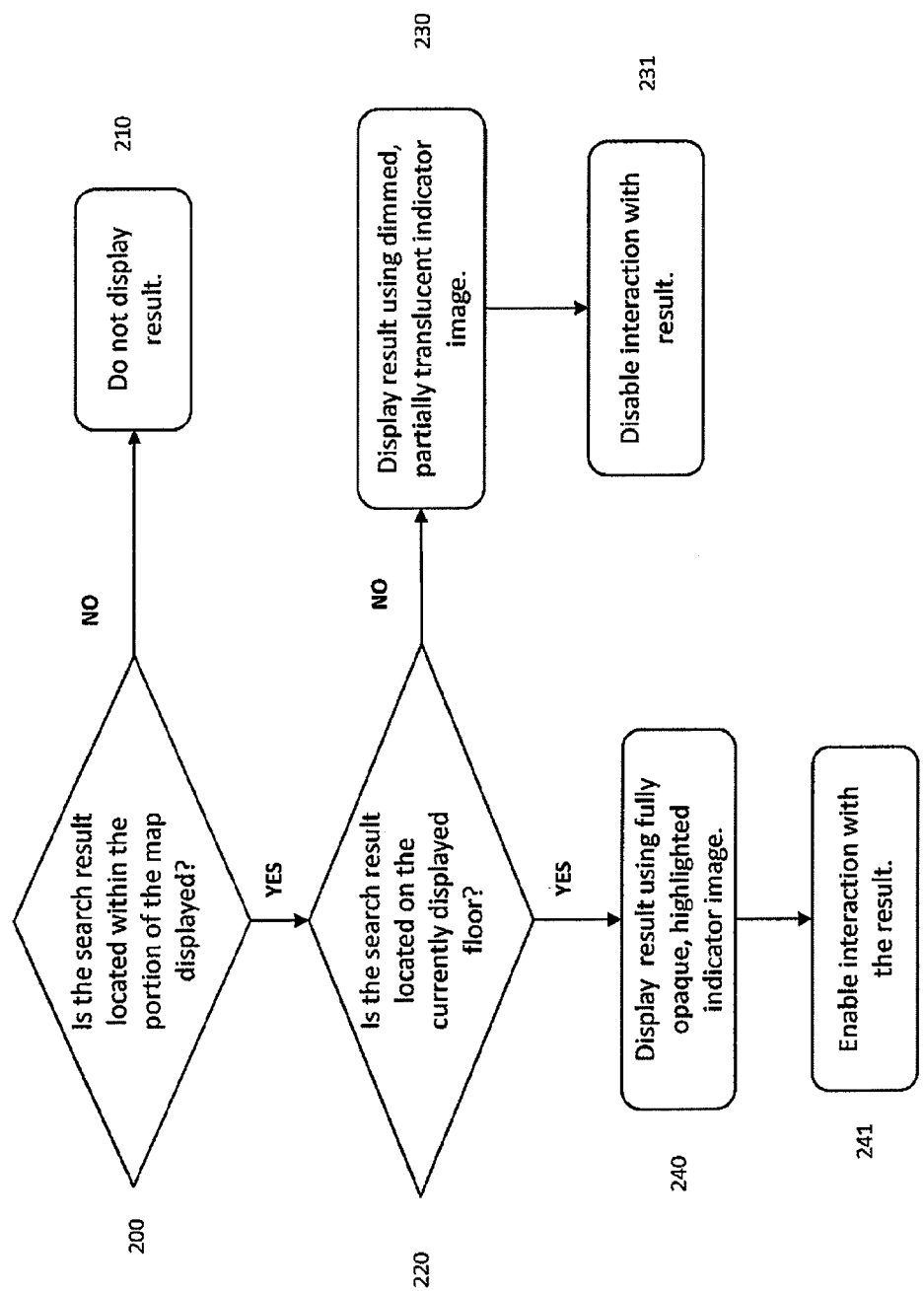

Having thus described embodiments of the invention in general terms, reference will now be made to the accompanying drawings, which are not necessarily drawn to scale, and wherein:

FIG. 1 is a schematic block diagram of a mobile terminal according to an example embodiment of the present invention;

FIG. 2 is a schematic block diagram of an apparatus for displaying search results and other points of interest on multiple levels in a multi-level map according to an example embodiment of the present invention;

FIG. 3 is a flowchart illustrating operations performed according to an example embodiment of the present invention;

FIG. 4 illustrates a display detailing search results and other points of interest on multiple levels in a multi-level map according to an example embodiment of the present invention;

FIG. 5 illustrates a display detailing search results and other points of interest on multiple levels in a multi-level map according to an example embodiment of the present invention; and FIG. 6 is another flowchart illustrating operations performed according to an example embodiment of the present invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1, one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20, or other processing device (e.g., processor 52 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display), a microphone 26 or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the invention will now be described with reference to FIG. 2, in which certain elements of an apparatus 50 for displaying search results and other points of interest on multiple levels in multi-level maps are depicted. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other terminal. Moreover, in some cases, the apparatus 50 may be on a fixed device such as a server or other service platform and the content may be presented (e.g., via a server/client relationship) on a remote device, such as a user terminal (e.g., the mobile terminal 10) based on processing that occurs at the fixed device.

It should also be noted that while FIG. 2 illustrates one example of a configuration of an apparatus 50 for displaying search results and other points of interest on multiple levels in multi-level maps, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for displaying search results and other points of interest on multiple levels in multi-level maps is provided and may include or otherwise be in communication with a processor 52, a user interface 54, a communication interface 56, and a memory device 58. In some embodiments, the processor 52 (and/or co-processors or any other processing circuitry assisting or otherwise associated with the processor 52) may be in communication with the memory device 58 via a bus for passing information among components of the apparatus 50. The memory device 58 may include, for example, one or more volatile and/or non-volatile memories. In other words, for example, the memory device 58 may be an electronic storage device (e.g., a computer readable storage medium) comprising gates configured to store data (e.g., bits) that may be retrievable by a machine (e.g., a computing device like the processor 52). The memory device 58 may be configured to store information, data, applications, instructions or the like for enabling the apparatus to carry out various functions in accordance with an example embodiment of the present invention. For example, the memory device 58 could be configured to buffer input data for processing by the processor 52. Additionally or alternatively, the memory device 58 could be configured to store instructions for execution by the processor 52.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 52 may be embodied in a number of different ways. For example, the processor 52 may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 52 may include one or more processing cores configured to perform independently. A multi-core processor may enable multiprocessing within a single physical package. Additionally or alternatively, the processor 52 may include one or more processors configured in tandem via the bus to enable independent execution of instructions, pipelining and/or multithreading.

In an example embodiment, the processor 52 may be configured to execute instructions stored in the memory device 58 or otherwise accessible to the processor 52. Alternatively or additionally, the processor 52 may be configured to execute hard coded functionality. As such, whether configured by hardware or software methods, or by a combination thereof, the processor 52 may represent an entity (e.g., physically embodied in circuitry) capable of performing operations according to an embodiment of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the algorithms and/or operations described herein when the instructions are executed. However, in some cases, the processor 52 may be a processor of a specific device (e.g., a mobile terminal or other computing device), such as processor 20 of mobile terminal 10 of FIG. 1, adapted for employing an embodiment of the present invention by further configuration of the processor 52 by instructions for performing the algorithms and/or operations described herein. The processor 52 may include, among other things, a clock, an arithmetic logic unit (ALU) and logic gates configured to support operation of the processor 52.

Meanwhile, the communication interface 56 may be any means such as a device or circuitry embodied in either hardware or a combination of hardware and software that is configured to receive and/or transmit data from/to a network and/or any other device or module in communication with the apparatus 50. In this regard, the communication interface 56 may include, for example, an antenna (or multiple antennas) and supporting hardware and/or software for enabling communications with a wireless communication network. Additionally or alternatively, the communication interface 56 may include the circuitry for interacting with the antenna(s) to cause transmission of signals via the antenna(s) or to handle receipt of signals received via the antenna(s). In some environments, the communication interface 56 may alternatively or also support wired communication. As such, for example, the communication interface 56 may include a communication modem and/or other hardware/software for supporting communication via cable, digital subscriber line (DSL), universal serial bus (USB) or other mechanisms.

The user interface 54 may be in communication with the processor 52 to receive an indication of a user input at the user interface 54 and/or to cause provision of an audible, visual, mechanical or other output to the user. As such, the user interface 54 may include, for example, a keyboard, a mouse, a joystick, a display, a touch screen(s), touch areas, soft keys, a microphone, a speaker, or other input/output mechanisms. Alternatively or additionally, the processor 52 may comprise user interface circuitry configured to control at least some functions of one or more elements of the user interface, such as, for example, a speaker, ringer, microphone, display, and/or the like. The processor 52 and/or user interface circuitry comprising the processor 52 may be configured to control one or more functions of one or more elements of the user interface through computer program instructions (e.g., software and/or firmware) stored on a memory accessible to the processor 52 (e.g., memory device 58, and/or the like).

Referring now to FIG. 3, the operations performed by an apparatus 50 in accordance with one example embodiment of the present invention are shown. In this regard, the apparatus may include means, such as the processor 52, the user interface 54, or the like, for causing the display of a multi-level map. According to one embodiment, the apparatus may include means for causing the display of a multi-dimensional, multi-level map. The multi-dimensional map may include at least a two-dimensional or a three-dimensional map. Although in one embodiment, the multi-dimensional map may include a two-dimensional map, other embodiments might include a three-dimensional map. Further, another embodiment may include an apparatus configured for causing the display of a three-dimensional map wherein a primary floor is displayed as a fully-opaque floor, while other floors are illustrated as translucent floors. According to one embodiment, the apparatus may be configured for causing the display of a three-dimensional map displaying a primary floor such that other floors are occluded by the display of the primary floor. In this regard, the multi-level map may be displayed upon a display, such as display 28 of FIG. 1. In one embodiment, the display screen provides a multi-level indoor map, although other types of multi-level maps may also be provided in accordance with other embodiments. As shown in FIGS. 4 and 5, a multi-level indoor map is displayed upon a display, and further includes a level selection interface. In the illustrated embodiment, the level selection interface includes a displayed level indicator, e.g., Level 0 in FIG. 4 and Level 1 in FIG. 5, and level selector icons to receive user input that directs the display of a different level, such as by transitioning from the display of Level 0 in FIG. 4 to the display of Level 1 in FIG. 5 in response to the selection of the up arrow while the map of Level 1 is being displayed. Although one example of a level selection interface is shown in FIGS. 4 and 5, other types of level selection interfaces may be included in other embodiments, such as a level selection interface comprising a drop-down box with a list of selectable levels available for display. Although the illustrated embodiments, as shown in FIGS. 4 and 5, include a multi-level indoor map of a shopping mall, other embodiments of the present invention may provide multi-level maps of other buildings, structures, or the like, such as airports, hospitals, universities, office buildings, or any other physical structure, and/or the like.

The method, apparatus and computer program product of an example embodiment may include a search interface for receiving a search query, such as a query requesting that a particular store, address or other point of interest be located and marked upon the map. By way of example, the display screens of FIGS. 4 and 5 may serve as a user interface that may also comprise a search interface, such as a text field for soliciting a textual search query coupled with a list of search results. As such, the apparatus 50 of FIG. 2 may include means, such as the processor 52, the user interface 54, or the like, for receiving an input indicating at least one search criteria. See operation 110 of FIG. 3. In the embodiments illustrated in FIGS. 4 and 5, for example, the user interface has received an input for searching "shoes" in the text field of the search interface. Accordingly, the list of search results provides search result positions related to the search criteria. Further, in another embodiment, the apparatus may be configured to receive an input indicating a selection of one of the search results. As such, the apparatus may be further configured to cause, based at least in response to a selection of one of the search results, the level of the map and the selected search result position indicator to be displayed. The search interface may be implemented in other manners, however, and may include a voice command input interface in one embodiment that is configured to receive a voice input as a search query. Additionally, while the search interface may be provided while a map is displayed as shown in FIGS. 4 and 5, the search interface may be provided and the search query may be input prior to the display of a map in other embodiments. Although in one embodiment, the apparatus may be configured to receive an input indicating a search criteria, such as a text input for a particular item like "shoes," in another embodiment, the apparatus may be configured to receive an input indicating a search criteria, wherein receiving an input indicating a search criteria could also include a situation where a user would want the apparatus to display points of interest from a previously defined set of points of interest, such as a user's favorite category. In addition, searching for points of interest may further encompass any method of receiving an input defining a criteria and determining a position related to that criteria.

The apparatus 50 of FIG. 2 may also include means, such as the processor 52, the memory 58, the user interface 54, or the like, for determining at least one search result related to the search criteria and, more particularly, for determining the location or position of the search result, hereinafter generally termed the search result position. See operation 120 of FIG. 3. In this regard, the apparatus 50 may determine whether at least one store, shop, point of interest, or the like appropriately matches the search criteria, as defined by the input to the text field of the search interface in the illustrated embodiment. As such, as shown in FIG. 4, the apparatus may be configured to determine a plurality of search result positions related to "shoe," the search criteria as defined by the input to the text field of the search interface.

As previously mentioned, one embodiment of the present invention may include an apparatus 50 configured to display a multi-level map. The apparatus 50 of FIG. 2 may include means, such as the processor 52, the memory 58, the user interface 54, or the like, for determining a relationship between the at least one search result position and a multi-level map. See operation 130 of FIG. 3. For example, the apparatus 50 may be configured to determine whether the at least one search result position is located on any level within that portion of the map that is displayed. Further, the apparatus 50 may be configured to determine, in an instance in which the search result position is located within that portion of the map that is displayed, whether the at least one search result position is located on the level that is being displayed or on another level. As shown in FIG. 4 in which a portion of the first level is shown, the apparatus may be configured to determine whether a search result position is located on the first level of the shopping mall and within the boundaries of the displayed portion of the map. Further, in regards to FIG. 5 in which a second level is depicted, the apparatus may be configured to determine whether a search result position is located on the second level of the shopping mall and within the boundaries of the displayed portion of the map.

As such, an apparatus 50 of FIG. 2 may include means such as the processor 52, the memory 58, the user interface 54, or the like, for causing, based at least in part on the relationship, the at least one search result position to be displayed as search result position indicators, wherein the displayed search result position indicators are presented in a different manner based at least in part on the relationship of the search result positions to the level that is currently being displayed. See operation 140 of FIG. 3. In this regard, the apparatus of one embodiment may cause the search result positions that are located within the portion of the map that is being displayed and on the level that is currently being displayed to be presented in one fashion, while presenting the search result positions that are located within the portion of the map that is being displayed, but on another level that is not being displayed to be presented in a different fashion. For example, the search result positions that are located on the same level as that being displayed may be depicted in a more noticeable fashion than the search result positions that are located on other levels. As shown in FIG. 4 in which a map of the first level is displayed, for example, those search result positions that are determined to be within the portion of the map that is displayed and to be located on the first level of the shopping mall are displayed as opaque pushpins, while the search result positions that are determined to be within the portion of the map that is displayed and to be located on the second level are displayed as translucent pushpins. Conversely, FIG. 5 depicts a map of the second level and now illustrates the search result positions located on the first level as the translucent pushpins indicting that the search result positions are not located on the displayed level of the indoor map (e.g., the second level). Although FIGS. 4 and 5 illustrate the search result position indicators as pushpins, the search result position indicator may comprise any generic visual indicator that includes, but is not limited to, icons, symbols, pictures, and/or the like.

Further, an apparatus, such as the processor 50, of another embodiment may be configured to determine whether a search result position is located on a level that is higher or lower than the current level that is displayed by the user interface. In this embodiment, the apparatus, such as the processor, may cause the search result positions that are higher than the current level to be displayed in one manner and the search result positions that are lower than the current level to be displayed in a different manner, thereby permitting a user to quickly determine the relative location of the search result positions with respect to the current level. Further, the apparatus, such as the processor, of one embodiment may be configured to determine the distance, such as in terms of the number of levels, between the current level that is displayed by the user interface and search result positions. As such, the apparatus, such as the processor, of this embodiment may be configured to cause the search result positions to be displayed in a manner that is dependent upon the distance between the search result positions and the current level, such as by causing the opacity or transparency to be dependent upon the distance, such that a user can quickly determine whether the search result positions are relatively close to or far away from the current level.

Referring to FIG. 6, the apparatus may be configured to determine a number of relationships between the at least one search result position and a multi-level map. For example, the apparatus 50 may include means, such as a processor 52, a memory 58, a user interface 54, or the like for determining whether a search result position is located within the boundaries of the map displayed by the user interface. See operation 200 of FIG. 6. If the search result position is not within the boundaries of the displayed map, the result is not displayed upon the display screen. See operation 210 of FIG. 6. In addition, the apparatus may be further configured to determine if the search result position is located on the currently displayed level when the search result position has been determined to be located within the boundaries of the displayed map. See operation 220 of FIG. 6. If the search result position is not located on the currently displayed level, but is within the boundaries of the displayed map, the apparatus may be configured to display the search result position as a search result position indicator in a first manner, such as a dimmed, partially translucent icon. See operation 230 of FIG. 6. However, if the search result position is located on the currently displayed level and within the boundaries of the displayed map, the apparatus may be configured to display the search result position in a different manner, such as a fully opaque, highlighted icon. See operation 240 of FIG. 6.

Although illustrated in the embodiments of FIGS. 4 and 5 as dimmed partially, translucent icons, a search result position located on a different level may be illustrated in different manners from those on the currently displayed level so as to distinguish those search result positions on the currently displayed level from search result positions on other levels, such as by displaying the search result positions with a different size, shape, color, outline, highlight, and/or the like. For example, although illustrated as fully opaque, highlighted icons in FIGS. 4 and 5, search result positions located on a currently displayed level may be illustrated as an icon with a halo, while search result positions on other levels may be illustrated as icons without a halo. As another example, an icon reflecting a search result position on a different level may be displayed as an icon of one color, whereas icons indicating a search result position is located on the currently displayed level appear as icons of a different color. For instance, the search result position indicator may be displayed as a particular color wherein each color corresponds to a specific level. As such, the apparatus may display a number of differently colored search result position indicators, wherein each search result position indicator may be readily identified as being located on a particular level by its respective color. In another embodiment, the size of the icon may differ to indicate the differing distances between search result positions located on different levels and the currently displayed level. For example, a search result position located one level away from the currently displayed level may appear larger on the displayed map than a search result position located ten levels away from the level currently displayed on the multi-level map. Further still, another embodiment of the present invention may include icons of different shapes to indicate which level a search result position is located. For instance, a search result position indicator may be shaped as a plus sign to indicate the location is above the currently displayed level, a minus sign to indicate the location is below the currently displayed level, and a circular pin to indicate the location is on the present level that is currently displayed. In another embodiment, each level may correspond to a particular shape such that a search result position located on a first level will be displayed as a search result position indicator having a shape corresponding to the first level, while a search result position located on a second level will be displayed as a search result position indicator having a shape corresponding to the second level, irrespective of which level is being currently displayed. In another embodiment, the search result position indicator may be coupled with a level indicator, the level indicator displaying a number, wherein the number corresponds to the level where the search result position is located. According to another embodiment, the level indicator may display a number corresponding to the number of levels away the search result position is located from the currently displayed level.

Further, the apparatus may be configured to enable interaction with an icon representative of a search result position located on the displayed level and disable interaction with an icon representative of a search result position located on a different level from the currently displayed level. See operations 241 and 231 of FIG. 6 respectively. According to one embodiment in which the apparatus is configured to enable interaction with the icon representative of a search result position located on the displayed level, a user may select an icon representative of a search result position located on the currently displayed level so as to cause a window, bubble, or other graphical pop-up to appear on the display with information related to the search result. The information may comprise details including the physical address, contact information, hours of operation, and/or the like. In another embodiment, interaction with the icon representative of a search result position located on the displayed level may initiate a request for directions to the search result position from a starting location. In contrast to the interaction provided in response to the selection of an icon representative of a search result position on the displayed level, the selection of an icon representative of a search result position on another level may not produce any response or at least less response. Although FIG. 6 illustrates interaction with the search result position may be enabled only when the search result position is located on the currently displayed level, in other embodiments, interaction with search result position may be enabled when the search result position is located within the map boundaries, regardless of whether the search result position is located on the currently displayed level or another level of the multi-level map. For example, interaction with an indicator of a search result position located on a different level from the currently displayed level may comprise opening a window, bubble or other graphical pop-up to appear on the display with information related to the search result. The information may comprise details including the physical address, contact information hours of operation, and/or the like. In addition, interaction with an indicator of a search result position located on a different level from the currently displayed level may further comprise causing the apparatus to change the currently displayed level to the different level of the search result position.

As described above, FIGS. 3 and 6 are flowcharts of a method and program product according to example embodiments of the invention. It will be understood that each block of the flowchart, and combination of blocks in the flowchart, may be implemented by various means, such as hardware, firmware, processor, circuitry and/or other device associated with execution of software including one or more computer program instructions. For example, one or more procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:
1. A method comprising:
receiving an input indicating a search criteria such that at least one search result position related to the search criteria and a relationship between the at least one search result position and a multi-level map are determinable;

causing, based at least in part on the relationship, a level of the map and the at least one search result position to be displayed as a search result position indicator, wherein, in an instance in which the search result position is not on the level of the map that is displayed, causing the search result position indicator for the search result position to be displayed in conjunction with the level of the map that is displayed even though the search result position is on another level of the map that is not displayed; and in an instance in which the search result position is not on the level of the map that is displayed, causing, with a processor, the level of the map that is displayed to change such that a level of the map that was not previously displayed is displayed in response to receipt of interaction with the search result position indicator.

2. A method according to claim 1 wherein the displayed search result position indicator is presented in a different manner based at least in part on whether the search result position is on the level of the map that is displayed or is on another level of the map.

3. A method according to claim 2 further comprising causing the manner in which the search result position indicator is presented to change along with the level of the map that is displayed in response to receipt of interaction with the search result position indicator.

4. A method according to claim 2 wherein the displayed search result position indicator is presented in a different color based at least in part on whether the search result position is on the level of the map that is displayed or is on another level of the map.

5. A method according to claim 2 wherein the displayed search result position indicator is presented in an at least partially dimmed manner in an instance in which the search result position is on another level of the map that is not displayed relative to an instance in which the search result position is on the level of the map that is displayed.

6. A method according to claim 1 wherein causing the level of the map that is displayed to change comprises causing the level of the map that is displayed to change to the level on which the search result position is located.

7. A method according to claim 1 further comprising causing information related to a search result to be displayed in response to receipt of interaction with the search result position indicator.

8. A method according to claim 1 further comprising causing directions to the search result position to be displayed in response to receipt of interaction with the search result position indicator.

9. A method according to claim 1 wherein the at least one search result position and the relationship between the at least one search result position and the multi-level map are determined by a device remote from the processor.

10. An apparatus comprising at least one processor and at least one memory storing computer program code, wherein the at least one memory and stored computer program code are configured, with the at least one processor, to cause the apparatus to at least:

receive an input indicating a search criteria such that
at least one search result position related to the search criteria and
a relationship between the at least one search result position and a multi-level map are determinable;

cause, based at least in part on the relationship, a level of the map and the at least one search result position to be displayed as a search result position indicator, wherein, in an instance in which the search result position is not on the level of the map that is displayed, the search result position indicator for the search result position is caused to be displayed in conjunction with the level of the map that is displayed even though the search result position is on another level of the map that is not displayed; and in an instance in which the search result position is not on the level of the map that is displayed, cause the level of the map that is displayed to change such that a level of the map that was not previously displayed is displayed in response to receipt of interaction with the search result position indicator.

11. An apparatus according to claim 10 wherein the displayed search result position indicator is presented in a different manner based at least in part on whether the search result position is on the level of the map that is displayed or is on another level of the map.

12. An apparatus according to claim 11 the at least one memory and stored computer program code are further configured, with the at least one processor, to cause the apparatus to cause the manner in which the search result position indicator is presented to change along with the level of the map that is displayed in response to receipt of interaction with the search result position indicator.

13. An apparatus according to claim 10 wherein the at least one memory and stored computer program code are configured, with the at least one processor, to cause the apparatus to cause the level of the map that is displayed to change by causing the level of the map that is displayed to change to the level on which the search result position is located.

14. An apparatus according to claim 10 wherein the at least one memory and stored computer program code are configured, with the at least one processor, to cause the apparatus to cause information related to a search result to be displayed in response to receipt of interaction with the search result position indicator.

15. An apparatus according to claim 10 wherein the at least one memory and stored computer program code are configured, with the at least one processor, to cause the apparatus to cause directions to the search result position to be displayed in response to receipt of interaction with the search result position indicator.

16. An apparatus according to claim 10 wherein the at least one search result position and the relationship between the at least one search result position and the multi-level map are determined by a device remote from the apparatus.

17. A computer program product comprising at least one non-transitory computer-readable storage medium having computer-readable program instructions stored therein, the computer-readable program instructions comprising program instructions configured to cause an apparatus to perform a method comprising:

receiving an input indicating a search criteria such that
at least one search result position related to the search criteria and
a relationship between the at least one search result position and a multi-level map are determinable;

causing, based at least in part on the relationship, a level of the map and the at least one search result position to be displayed as a search result position indicator, wherein, in an instance in which the search result position is not on the level of the map that is displayed, causing the search result position indicator for the search result position to be displayed in conjunction with the level of the map that is displayed even though the search result position is on another level of the map that is not displayed; and in an instance in which the search result position is not on the level of the map that is displayed, causing the level of the map that is displayed to change such that a level of the map that was not previously displayed is displayed in response to receipt of interaction with the search result position indicator.

18. A computer program product according to claim 17 wherein the displayed search result position indicator is presented in a different manner based at least in part on whether the search result position is on the level of the map that is displayed or is on another level of the map.

19. A computer program product according to claim 18 wherein the computer-readable program instructions further comprise program instructions configured to cause the manner in which the search result position indicator is presented to change along with the level of the map that is displayed in response to receipt of interaction with the search result position indicator.

20. A computer program product according to claim 17 wherein the program instructions configured to cause the level of the map that is displayed to change comprise program instructions configured to cause the level of the map that is displayed to change to the level on which the search result position is located.

21. A computer program product according to claim 17 wherein the at least one search result position and the relationship between the at least one search result position and the multi-level map are determined by a device remote from the apparatus.

* * * * *